United States Patent
Wu

(10) Patent No.: US 8,868,793 B2
(45) Date of Patent: Oct. 21, 2014

(54) SAS EXPANDER SYSTEM AND METHOD FOR DYNAMICALLY ALLOCATING SAS ADDRESSES TO SAS EXPANDER DEVICES

(71) Applicant: Hon Hai Precision Industry Co., Ltd., New Taipei (TW)

(72) Inventor: Chih-Huang Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/029,885

(22) Filed: Sep. 18, 2013

(65) Prior Publication Data

US 2014/0143447 A1 May 22, 2014

(30) Foreign Application Priority Data

Nov. 16, 2012 (TW) .............................. 101142735 A

(51) Int. Cl.
*G06F 3/00* (2006.01)
*G06F 11/00* (2006.01)
*G06F 3/06* (2006.01)

(52) U.S. Cl.
CPC ............ *G06F 3/0685* (2013.01); *G06F 3/0638* (2013.01); *G06F 3/061* (2013.01)
USPC ................................................ 710/3; 714/44

(58) Field of Classification Search
None
See application file for complete search history.

(56) References Cited

U.S. PATENT DOCUMENTS

2014/0115418 A1* 4/2014 Raghavan et al. ............ 714/758
2014/0122744 A1* 5/2014 Madhusudana et al. .......... 710/2

* cited by examiner

*Primary Examiner* — Hyun Nam
(74) *Attorney, Agent, or Firm* — Novak Druce Connolly Bove + Quigg LLP

(57) ABSTRACT

In a method for allocating SAS addresses to SAS expander devices in an SAS expander system, the SAS expander system includes a master SAS expander device, a slave SAS expander device and an EEPROM. The method defines an address parameter for specifying a master SAS address for the master SAS expander device and specifying a slave SAS address for the slave SAS expander device, and obtains an original SAS address from the EEPROM when the original SAS address is identical to either the master SAS address or the slave SAS address. The method adds the address parameter to the original SAS address to generate a first SAS address and allocates the first SAS address to the master SAS expander device. The method adds the address parameter to the first SAS address to generate a second SAS address, and allocates the second SAS address to the slave SAS expander device.

18 Claims, 3 Drawing Sheets

SAS EXPANDER SYSTEM AND METHOD FOR DYNAMICALLY ALLOCATING SAS ADDRESSES TO SAS EXPANDER DEVICES

BACKGROUND

1. Technical Field

Embodiments of the present disclosure relate to Serial Attached Small Computer System Interface (SAS) expanders, and particularly to an SAS expander system and a method for allocating an SAS address to each SAS expander device in the SAS expander system.

2. Description of Related Art

SAS expanders can be generally described as a switch device that allows initiator devices and target devices to communicate with each other, and allows additional initiator devices and target devices to be added to the SAS expander system. Each of the SAS expanders has a unique SAS address to communicate with each other. However, if an SAS device is removed and replaced by a new SAS device, the old SAS address remains bound to the SAS expander, and thus any input-output (I/O) requests targeted to the removed SAS device may be delivered to the new SAS device connected to the same port, potentially corrupting the new SAS device, and data error may be occurred in the new SAS device when the new SAS device accesses the storage system.

What is needed, therefore, is an SAS expander system and a method to overcome the limitation described.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable media or storage medium. Some non-limiting examples of a non-transitory computer-readable medium include CDs, DVDs, flash memory, and hard disk drives.

Figure 1:
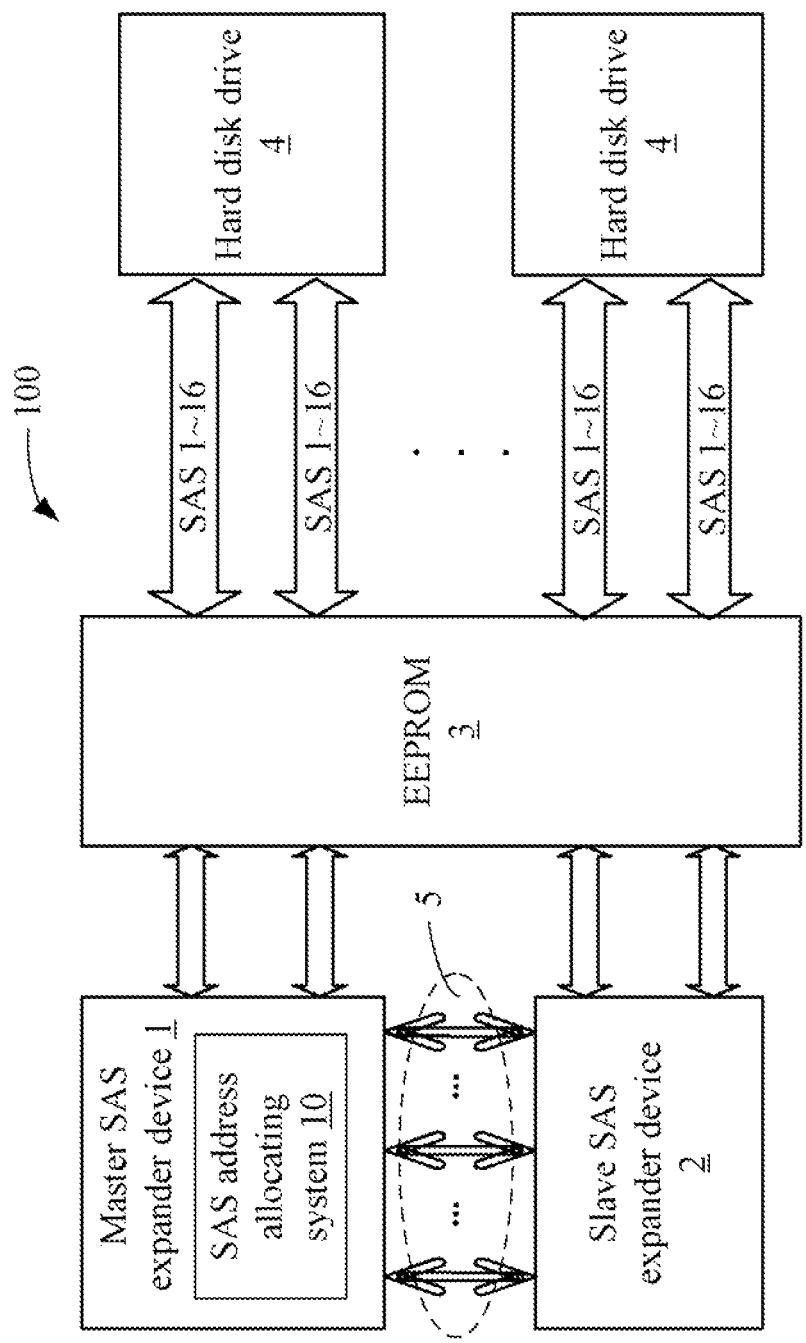
FIG. 1 is a block diagram of one embodiment of a serial attached small computer system interface (SAS) expander system.

FIG. 1 is a block diagram of one embodiment of a serial attached small computer system interface (SAS) expander system 100. In the embodiment, the SAS expander system 100 includes a master SAS expander device 1, at least one slave SAS expander device 2, an Electrically-Erasable Programmable Read-Only Memory (EEPROM) 3, and a plurality of hard disk drive (HDD) 4. The slave SAS expander device 2 connects to the master SAS expander device 1 through a plurality of communication channels 5. The master SAS expander device 1 and the slave SAS expander device 2 can read and write data in each of the hard disk drives 4 through the EEPROM 3. In the embodiment, the EEPROM 3 stores an original address of the master SAS expander device 1, such as an address number 0x500605330000013F.

In one embodiment, the master SAS expander device 1 includes an SAS address allocating system 10, which can dynamically allocate a unique SAS address to the master SAS expander device 1 and the slave SAS expander device 2 when the SAS address of the slave SAS expander device 2 conflicts with the SAS address of the master SAS expander device 1. The SAS address is an address value represented by a hex number, and is used to identify the master SAS expander device 1 or the slave SAS expander device 2.

Figure 2:
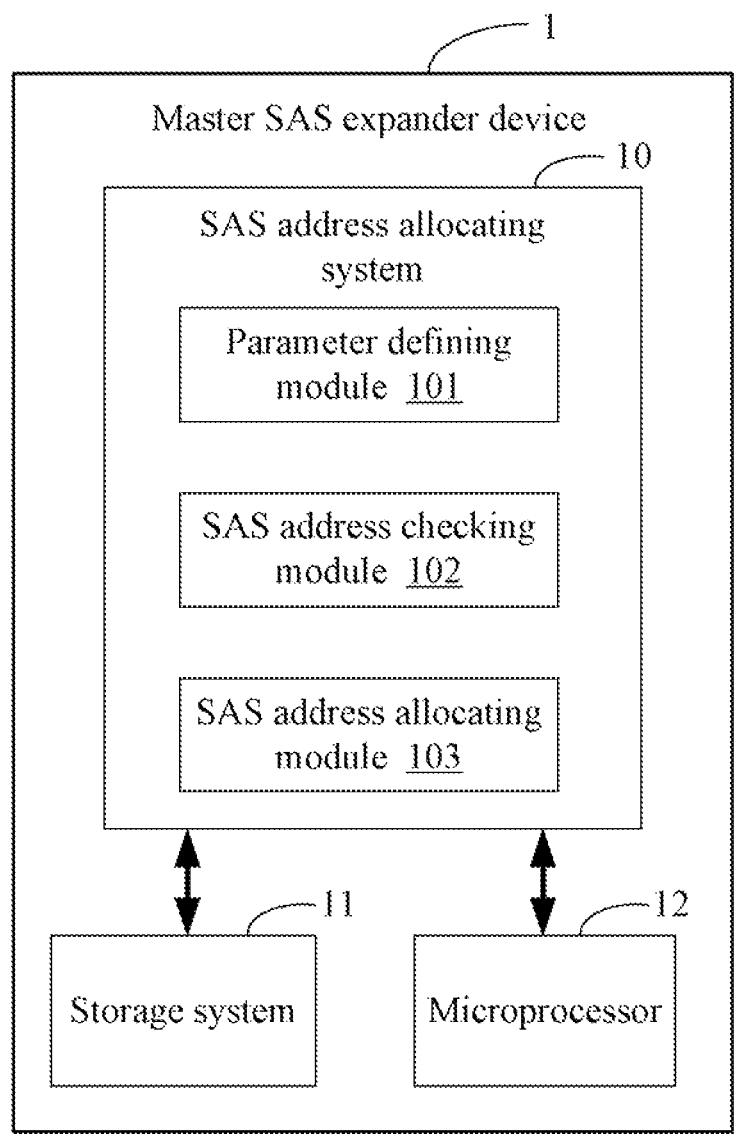
FIG. 2 is a block diagram illustrating function modules of an SAS address allocating system included in a master SAS expander device.

FIG. 2 is a block diagram illustrating function modules of the SAS address allocating system 10 included in the master SAS expander device 1. In the embodiment, the master SAS expander device 1 further includes, but is not limited to, a storage system 11 and at least one microprocessor 12. The SAS address allocating system 10 may include computerized instructions in the form of one or more programs that are stored in the storage system 11 and executed by the at least one microprocessor 12.

In one embodiment, the storage system 11 may be an internal storage system, such as a random access memory (RAM) for temporary storage of information, and/or a read only memory (ROM) for permanent storage of information. The storage system 11 may also be an external storage system, such as an external hard disk, a storage card, network attached storage (NAS), a web database, or a data storage medium. The at least one microprocessor 12 is a central processing unit (CPU) or data processor that performs various functions of the master SAS expander device 1.

In the embodiment, the SAS address allocating system 10 includes a parameter defining module 101, an SAS address checking module 102, and an SAS address allocating module 103. The modules 101-103 may comprise computerized instructions in the form of one or more computer-readable programs that are stored in a non-transitory computer-readable medium (such as the storage system 11) and executed by the at least one microprocessor 12. A description of each module is given in the following paragraphs.

Figure 3:
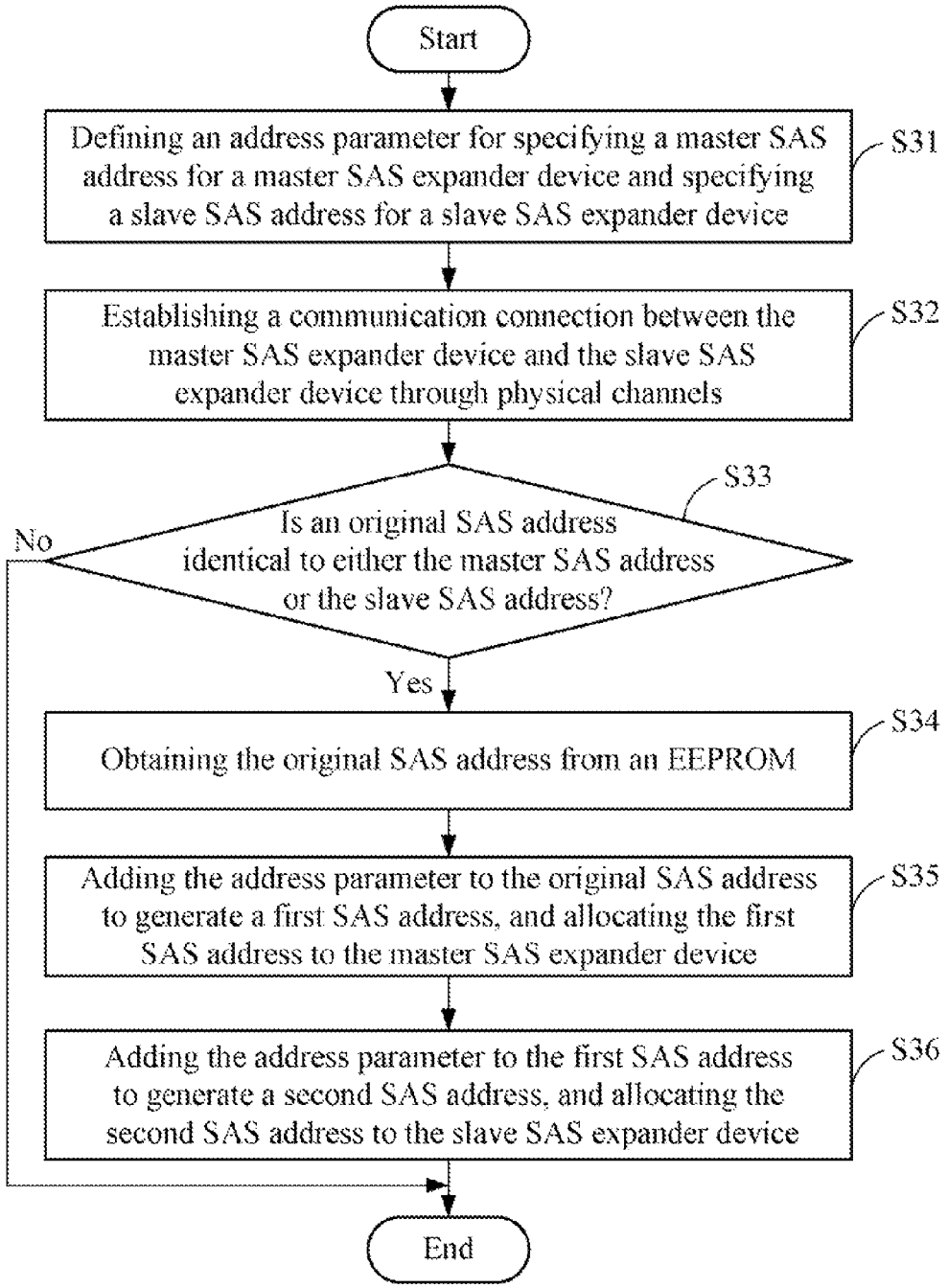
FIG. 3 is a flowchart of one embodiment of a method of allocating SAS addresses to SAS expander devices in the SAS expander system of FIG. 1.

FIG. 3 is a flowchart of one embodiment of a method for allocating SAS addresses to SAS expander devices in the SAS expander system 100. In the embodiment, the method can dynamically allocate a unique SAS address to the master SAS expander device 1 and the slave SAS expander device 2 when an SAS address of the slave SAS expander device 2 conflicts with an SAS address of the master SAS expander device 1. Depending on the embodiment, additional steps may be added, others removed, and the ordering of the steps may be changed.

In step S31, the parameter defining module 101 defines an address parameter for specifying a master SAS address for the master SAS expander device 1 and specifying a slave SAS address for the slave SAS expander device 2. In the embodiment, the address parameter is determined according to a total number of the communication channels 5 between the master SAS expander device 1 and the slave SAS expander device 2. The communication channels 5 may include a plurality of physical links, a plurality of virtual links, and a plurality of default links. For example, if the total number of the communication channels 5 is 40, which include 36 numbers of the physical links, two numbers of the virtual links, and two numbers of the default links, then the address parameter is defined as 40.

In step S32, the parameter defining module 101 establishes a communication connection between the master SAS expander device 1 and the slave SAS expander device 2 through the communication channels 5. In the embodiment, the communication channels 5 may include 36 numbers of the physical links, two numbers of the virtual links, and two numbers of the default links.

In step S33, the SAS address checking module 102 determines whether an original SAS address of the master SAS expander device 1 is identical to either the master SAS address or the slave SAS address specified by the parameter defining module 101. In the embodiment, the original SAS address of the master SAS expander device 1 is stored in the EEPROM 3. If the original SAS address of the master SAS expander device 1 is identical to either the master SAS address or the slave SAS address, step S34 is implemented. Otherwise, if neither the master SAS address nor the slave SAS address is identical to the original SAS address of the master SAS expander device 1, the SAS address checking module 102 determines the master SAS address of the master SAS expander device 1 and the slave SAS address of the slave SAS expander device 2 are enabled, and then the process goes to end.

In step S34, the SAS address allocating module 103 obtains the original SAS address of the master SAS expander device 1 from the EEPROM 3. In the embodiment, the original SAS address of the master SAS expander device 1 is stored in the EEPROM 3, and may be an address number 0x500605330000013F.

In step S35, the SAS address allocating module 103 adds the address parameter to the original SAS address of the master SAS expander device 1 to generate a first SAS address, and allocates the first SAS address to the master SAS expander device 1. For example, if the address parameter is defined as 40 and the original SAS address is 0x500605330000013F, the SAS address allocating module 103 obtains the first SAS address 0x500605330000017F by adding the address parameter 40 to the original SAS address 0x500605330000013F, and allocates the first SAS address 0x500605330000017F to the master SAS expander device 1.

In step S36, the SAS address allocating module 103 adds the address parameter to the first SAS address to generate a second SAS address, and allocates the second SAS address to the slave SAS expander device 2. In the embodiment, the SAS address allocating module 103 obtains the second SAS address 0x50060533000001BF by adding the address parameter 40 to the first SAS address 0x500605330000017F, and allocates the first SAS address 0x50060533000001BF to the slave SAS expander device 2.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A serial attached small computer system interface (SAS) expander system comprising a master SAS expander device, a slave SAS expander device and an EEPROM, the master SAS expander device comprising:
   at least one microprocessor; and
   a storage system storing a computer-readable program including instructions that, which when executed by the at least one microprocessor, causes the at least one microprocessor to:
   define an address parameter for specifying a master SAS address for the master SAS expander device and specifying a slave SAS address for the slave SAS expander device;
   establish a communication connection between the master SAS expander device and the slave SAS expander device through a plurality of communication channels;
   determine whether an original SAS address of the master SAS expander device is identical to either the master SAS address or the slave SAS address;
   obtain the original SAS address from the EEPROM when the original SAS address is identical to either the master SAS address or the slave SAS address;
   add the address parameter to the original SAS address to generate a first SAS address, and allocate the first SAS address to the master SAS expander device; and
   add the address parameter to the first SAS address to generate a second SAS address, and allocate the second SAS address to the slave SAS expander device.

2. The SAS expander system according to claim 1, further comprising a plurality of hard disk drives connected to the EEPROM.

3. The SAS expander system according to claim 2, wherein the master SAS expander device and the slave SAS expander device reads and writes data in each of the hard disk drives through the EEPROM.

4. The SAS expander system according to claim 1, wherein the address parameter is determined according to a total number of the communication channels between the master SAS expander device and the slave SAS expander device.

5. The SAS expander system according to claim 1, wherein the communication channels comprise a plurality of physical links, a plurality of virtual links, and a plurality of default links.

6. The SAS expander system according to claim 1, wherein the master SAS address of the master SAS expander device and the slave SAS address of the slave SAS expander device are enabled if neither the master SAS address nor the slave SAS address is identical to the original SAS address of the master SAS expander device.

7. A method for allocating serial attached small computer system interface (SAS) addresses to SAS expander devices in an SAS expander system, the SAS expander system comprising a master SAS expander device, a slave SAS expander device and an EEPROM, the method comprising:
   defining an address parameter for specifying a master SAS address for the master SAS expander device and specifying a slave SAS address for the slave SAS expander device;
   establishing a communication connection between the master SAS expander device and the slave SAS expander device through a plurality of communication channels;
   determining whether an original SAS address of the master SAS expander device is identical to either the master SAS address or the slave SAS address;
   obtaining the original SAS address from the EEPROM when the original SAS address is identical to either the master SAS address or the slave SAS address;
   adding the address parameter to the original SAS address to generate a first SAS address, and allocating the first SAS address to the master SAS expander device; and adding the address parameter to the first SAS address to generate a second SAS address, and allocating the second SAS address to the slave SAS expander device.

8. The method according to claim 7, wherein the SAS expander system further comprises a plurality of hard disk drives connected to the EEPROM.

9. The method according to claim 8, wherein the master SAS expander device and the slave SAS expander device reads and writes data in each of the hard disk drives through the EEPROM.

10. The method according to claim 7, wherein the address parameter is determined according to a total number of the communication channels between the master SAS expander device and the slave SAS expander device.

11. The method according to claim 7, wherein the communication channels comprise a plurality of physical links, a plurality of virtual links, and a plurality of default links.

12. The method according to claim 7, wherein the master SAS address of the master SAS expander device and the slave SAS address of the slave SAS expander device are enabled if neither the master SAS address nor the slave SAS address is identical to the original SAS address of the master SAS expander device.

13. A non-transitory storage medium having stored thereon instructions that, when executed by at least one microprocessor of a master serial attached small computer system interface (SAS) expander device, cause the microprocessor to perform a method for allocating SAS addresses to SAS expander devices in an SAS expander system, the SAS expander system comprising the master SAS expander device, a slave SAS expander device and an EEPROM, the method comprising:

defining an address parameter for specifying a master SAS address for the master SAS expander device and specifying a slave SAS address for the slave SAS expander device;

establishing a communication connection between the master SAS expander device and the slave SAS expander device through a plurality of communication channels;

determining whether an original SAS address of the master SAS expander device is identical to either the master SAS address or the slave SAS address;

obtaining the original SAS address from the EEPROM when the original SAS address is identical to either the master SAS address or the slave SAS address;

adding the address parameter to the original SAS address to generate a first SAS address, and allocating the first SAS address to the master SAS expander device; and adding the address parameter to the first SAS address to generate a second SAS address, and allocating the second SAS address to the slave SAS expander device.

14. The storage medium according to claim 13, wherein the SAS expander system further comprises a plurality of hard disk drives connected to the EEPROM.

15. The storage medium according to claim 14, wherein the master SAS expander device and the slave SAS expander device reads and writes data in each of the hard disk drives through the EEPROM.

16. The storage medium according to claim 13, wherein the address parameter is determined according to a total number of the communication channels between the master SAS expander device and the slave SAS expander device.

17. The storage medium according to claim 13, wherein the communication channels comprise a plurality of physical links, a plurality of virtual links, and a plurality of default links.

18. The storage medium according to claim 13, wherein the master SAS address of the master SAS expander device and the slave SAS address of the slave SAS expander device are enabled if neither the master SAS address nor the slave SAS address is identical to the original SAS address of the master SAS expander device.

* * * * *